(12) United States Patent
Figgins et al.

(10) Patent No.: US 7,861,505 B1
(45) Date of Patent: Jan. 4, 2011

(54) REDUCED-WEIGHT PLANT-CUTTING ASSEMBLY FOR A HEADER

(75) Inventors: Ryan Figgins, New Holland, PA (US); Karl Klotzbach, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/582,315

(22) Filed: Oct. 20, 2009

(51) Int. Cl.
*A01D 34/13* (2006.01)

(52) U.S. Cl. ........................................ 56/296
(58) Field of Classification Search ............... 56/296, 56/302, 300, 303, 299, 298; 411/169; 403/341
See application file for complete search history.

(56) References Cited

U.S. PATENT DOCUMENTS

| | | | |
|---|---|---|---|
| 196,952 A | 11/1877 | Swart | |
| 235,855 A | 12/1880 | Deevy | |
| 318,802 A | 5/1885 | Ratcliff | |
| 329,696 A | 11/1885 | Barnes | |
| 531,987 A | 1/1895 | Wiseman | |
| 574,736 A | 1/1897 | Jarvis | |
| 683,118 A | 9/1901 | Hodges | |
| 985,948 A | 3/1911 | Smith et al. | |
| 1,049,675 A | 1/1913 | Conner | |
| 1,231,111 A | 6/1917 | Alford | |
| 1,233,950 A * | 7/1917 | Aidlotte | 56/300 |
| 1,340,868 A | 5/1920 | Aidlotte | |
| 2,217,741 A | 10/1940 | Gillette | |
| 4,021,999 A * | 5/1977 | Case | 56/298 |
| 4,805,390 A | 2/1989 | Majkrzak | |
| 5,040,363 A | 8/1991 | Limburg et al. | |
| 5,161,357 A * | 11/1992 | Braunberger et al. | 56/3 |
| RE34,225 E * | 4/1993 | Majkrzak | 56/300 |
| 6,886,316 B2 * | 5/2005 | Schumacher | 56/296 |

FOREIGN PATENT DOCUMENTS

DE          19526191 A1  *   1/1996

* cited by examiner

*Primary Examiner*—Árpád Fábián-Kovács
(74) *Attorney, Agent, or Firm*—Michael G. Harms; Patrick M. Sheldrake

(57) ABSTRACT

A cutting assembly for a header of a plant-cutting machine has an elongate blade support bar including a first elongate segment that can engage a second elongate segment by interlocking. Overlying the elongate blade support bar is a plurality of blade sections, including first sub-plurality of blade sections overlying a first lengthwise portion of the first elongate segment, and a second sub-plurality of blade sections overlying a second lengthwise portion of the first elongate segment and a third lengthwise portion of the second elongate segment. An elongate attach bar overlies the first sub-plurality of blade sections, and a spanning bar overlies the second sub-plurality of blade sections.

18 Claims, 5 Drawing Sheets

REDUCED-WEIGHT PLANT-CUTTING ASSEMBLY FOR A HEADER

This invention relates generally to a cutting assembly for a header of a plant-cutting machine (e.g., combine, windrower) and, more specifically, to a cutting assembly having an elongate support bar comprising a plurality of interlocking segments.

BACKGROUND OF THE INVENTION

The cutting assemblies of many known large headers of plant-cutting machines (e.g., combine, windrower) are driven from the side or end of the header by an oscillating drive. Generally, these cutting assemblies include a single knife or sickle having multiple blades that is long, bulky, and heavy. During operation of the plant-cutting machine, these heavy knives generate significant vibrations, which contribute to wear and tear of the knife drive, decreasing longevity and increasing maintenance costs. Additionally, these long knives generally cannot be broken down appreciably into smaller components to facilitate shipping and/or storage. Furthermore, repair of individual blades in many instances requires removal of the entire knife.

Accordingly, what is sought is a cutting assembly that has a reduced mass, that can be broken down into relatively small components, and that allows for relatively efficient repair and/or replacement of at least some individual blades.

SUMMARY OF THE INVENTION

In accordance with one aspect of the present invention, a cutting assembly for a header of an agricultural cutting machine is disclosed. The cutting assembly includes an elongate blade support bar and a plurality of blade sections overlying the elongate blade support bar. The elongate blade support bar has a major axis and a plurality of blade support bar through-openings configured to receive a fastener therethrough along an axis substantially perpendicular to the major axis. Additionally, the elongate blade support bar includes a first elongate segment and a second elongate segment. The first elongate segment includes a first end and an opposing second end, and the second elongate segment includes a third end. The third end engages the second end to interlock the first elongate segment and the second elongate segment. Each blade section of the plurality of blade sections includes a trailing edge and at least one blade aperture proximate to the trailing edge. The at least one blade aperture is substantially coaxial to a corresponding blade support bar through-opening. The plurality of blade sections includes a first sub-plurality of blade sections overlying a first lengthwise portion of the first elongate segment. The first lengthwise portion is proximate to the first end. The plurality of blade sections further comprises a second sub-plurality of blade sections overlying a second lengthwise portion of the first elongate segment and a third lengthwise portion of the second elongate segment. The second lengthwise portion includes the second end, and the third lengthwise portion includes the third end. Additionally, the cutting assembly includes an elongate attach bar overlying the first sub-plurality of blade sections. The elongate attach bar includes a plurality of attach bar through-openings coaxial to a corresponding aperture of the at least one blade apertures. The elongate attach bar is configured to be drivingly connected to a header. Additionally, the cutting assembly includes a spanning bar overlying the second sub-plurality of blade sections and comprising a plurality of spanning bar through-openings being coaxial to a corresponding aperture of the at least one blade apertures.

In accordance with another aspect of the present invention, a cutting assembly for a header of an agricultural cutting machine is disclosed. The cutting assembly includes an elongate blade support bar and a plurality of blade sections overlying the elongate blade support bar. The elongate blade support bar has a major axis and a plurality of blade support bar through-openings configured to receive a fastener therethrough along an axis substantially perpendicular to the major axis. Additionally, the elongate blade support bar includes a first elongate segment and a second elongate segment. The first elongate segment includes a first end and an opposing second end, and the second elongate segment includes a third end. The third end engages the second end to interlock the first elongate segment and the second elongate segment. Each blade section of the plurality of blade sections includes a trailing edge and at least one blade aperture proximate to the trailing edge. The at least one blade aperture is substantially coaxial to a corresponding blade support bar through-opening. The plurality of blade sections includes a first sub-plurality of blade sections overlying a first lengthwise portion of the first elongate segment. The first lengthwise portion is proximate to the first end. The plurality of blade sections further comprises a second sub-plurality of blade sections overlying a second lengthwise portion of the first elongate segment and a third lengthwise portion of the second elongate segment. The second lengthwise portion includes the second end, and the third lengthwise portion includes the third end. The first elongate segment includes a first ratio of mass to number of supported (or overlying) blade sections and the second elongate segment includes a second ratio of mass to number of supported (or overlying) blade sections, the second ratio being less than the first ratio. Additionally, the cutting assembly includes a spanning bar overlying the second sub-plurality of blade sections and comprising a plurality of spanning bar through-openings being coaxial to a corresponding aperture of the at least one blade apertures.

In accordance with still another aspect of the present invention, a header for a plant-cutting machine is disclosed. The header includes a cutting assembly, which includes an elongate blade support bar and a plurality of blade sections overlying the elongate blade support bar. The elongate blade support bar has a major axis and a plurality of blade support bar through-openings configured to receive a fastener therethrough along an axis substantially perpendicular to the major axis. Additionally, the elongate blade support bar includes a first elongate segment, a second elongate segment, and a third elongate segment. The first elongate segment includes a first end and an opposing second end, and the second elongate segment includes a third end and an opposing fourth end. The third elongate segment includes a fifth end. The third end engages the second end to interlock the first elongate segment and the second elongate segment. The fifth end engages the fourth end to interlock the second elongate segment and the third elongate segment. The first elongate segment has a first average thickness, the second elongate segment has a second average thickness, and the third elongate segment has a third average thickness, the third average thickness being less than the second average thickness, the second average thickness being less than the first average thickness. Each blade section of the plurality of blade sections includes a trailing edge and at least one blade aperture proximate to the trailing edge. The at least one blade aperture is substantially coaxial to a corresponding blade support bar through-opening. The plurality of blade sections includes a first sub-plurality of blade sections overlying a first lengthwise portion of the first elongate segment. The first lengthwise portion is proximate to the first end. The plurality of blade sections further comprises a second sub-plurality of blade sections overlying a second lengthwise portion of the first elongate segment and a third lengthwise portion of the second elongate segment. The second lengthwise portion includes the second end, and the third lengthwise portion includes the third end. The plurality of blade sections further includes a third sub-plurality of blade sections overlying a fourth lengthwise portion of the second elongate segment and a fifth lengthwise portion of the third elongate segment. The fourth lengthwise portion includes the fourth end, and the fifth lengthwise portion includes the fifth end. Additionally, the cutting assembly includes an elongate attach bar overlying the first sub-plurality of blade sections. The elongate attach bar includes a plurality of attach bar through-openings coaxial to a corresponding aperture of the at least one blade apertures. The elongate attach bar is configured to be drivingly connected to a header. Additionally, the cutting assembly includes a first spanning bar overlying the second sub-plurality of blade sections and including a plurality of first spanning bar through-openings being coaxial to a corresponding aperture of the at least one blade apertures. The cutting assembly also includes a second spanning bar overlying the third sub-plurality of blade sections and including a plurality of second spanning bar through-openings being coaxial to a corresponding aperture of the at least one blade apertures.

An advantage of the cutting assembly disclosed herein is that it has a reduced mass, thereby improving efficiency, reducing vibration, and promoting longevity of the motor drive.

Another advantage of the cutting assembly disclosed herein is that removal of blade sections relatively distal to the drive end of the cutting assembly can be efficiently effected by releasing or removing a small number of fasteners and, perhaps, a spanning bar, and does not require removal of any blade sections proximate to the drive end.

Still another advantage of the cutting assembly disclosed herein is that it can be comprised only of relatively small components and, therefore, can be shipped and/or stored more readily.

Still yet another advantage of the cutting assembly is that the elongate blade support bar can be divided lengthwise into two or more interlocking segments, increasing tolerance to bends in the vertical direction.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
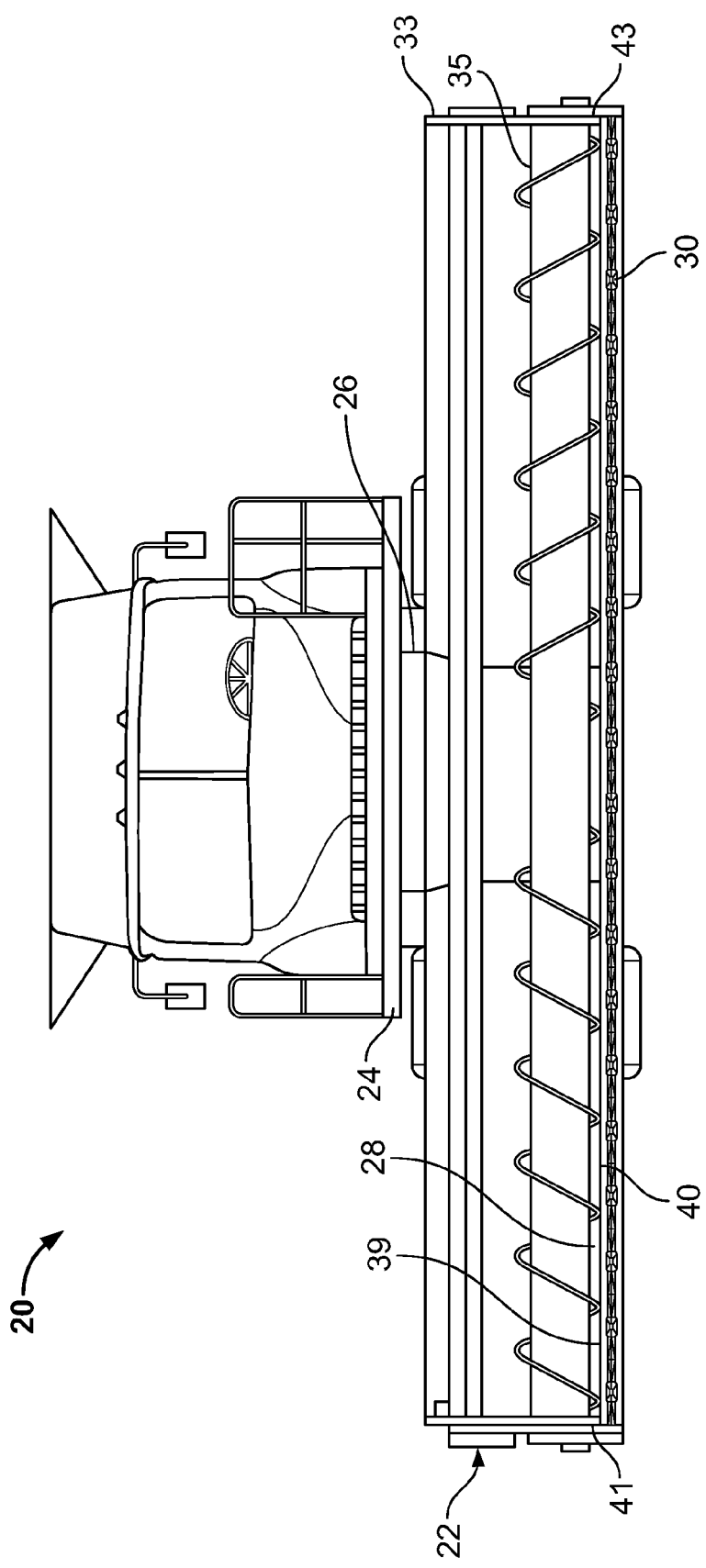
FIG. 1 is a front view of a combine.

A combine 20, which is a well-known agricultural cutting machine, is shown in FIG. 1. Combine 20 includes a header 22, which is configured to cut or sever crops, including (without limitation) small grains (e.g., wheat, soybeans), and to induct the cut or severed crops into a feeder 26. Both functions can be performed as combine 20 moves forward over a crop field.

Header 22 is attached to a forward end 24 of combine 20 and includes a pan or floor 28 that is supported in desired proximity to the surface of a crop field. Header 22 includes an elongate sideward extending sickle or cutting assembly 30 along a forward edge portion of floor 28. Cutting assembly 30 is configured to cut or sever crops, in preparation for inducting into feeder 26. Additionally, header 22 includes an elongate sideward extending reel 33 disposed above cutting assembly 30. Reel 33 is rotatable in a direction suitable for facilitating the induction of cut or severed crops into feeder 26. Header 22 further includes an elongate, rotatable auger 35, which extends in close proximity to a top surface 39 of floor 28 and has helical flights therearound. Auger 35 is configured to cooperate with reel 33 in conveying cut or severed crops to feeder 26, which is configured to convey the cut or severed crops into combine 20 for threshing and cleaning. Alternatively, instead of rotatable auger 35, header 22 may include a draper head or other crop harvesting/gathering header. Cutting assembly 30 may be bounded by a first side edge 41 and an opposing second side edge 43. During operation, cutting assembly 30 reciprocates rapidly to effect a cutting or severing action that cuts or severs plant stems, stalks or other agricultural material. Cutting assembly 30 reciprocates on a plane that is generally perpendicular to the forward motion of combine 20 and approximately parallel to the surface of the crop field.

Figure 2:
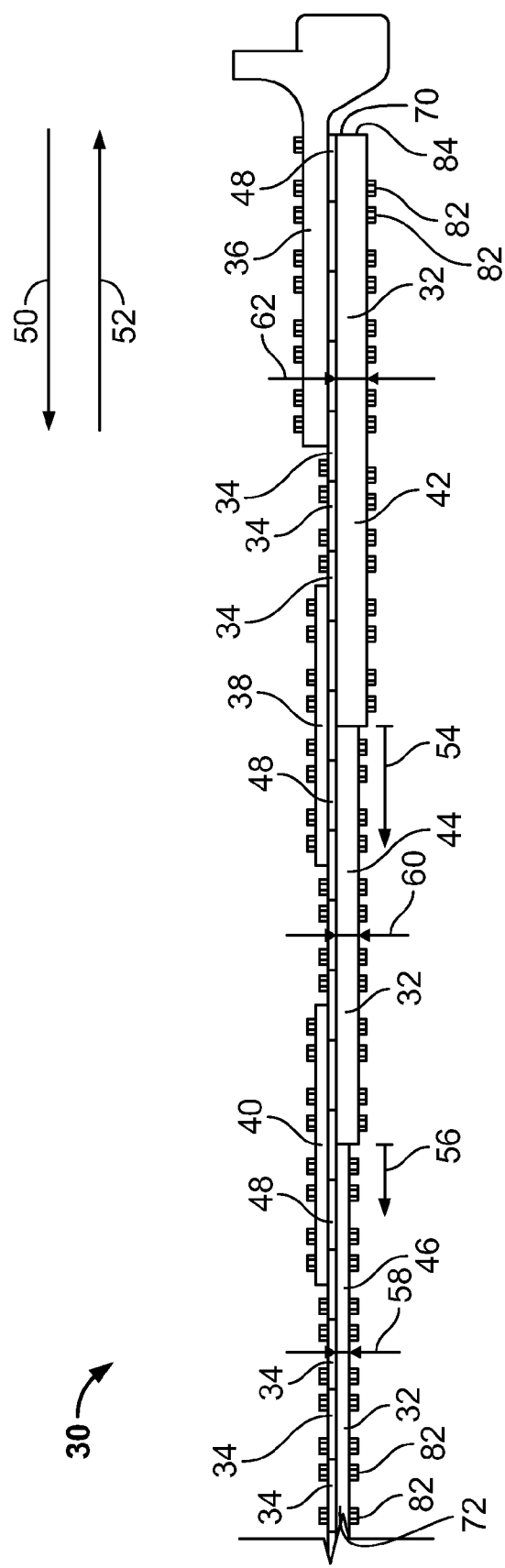
FIG. 2 is a front view of an exemplary embodiment of the cutting assembly of the present invention.

FIG. 2 is a front view of an exemplary embodiment of the cutting assembly of the present invention. Cutting assembly 30 may include an elongate blade support bar 32, a plurality 34 of blade sections 48 overlying the elongate blade support bar 32, an elongate attach bar 36, a first spanning bar 38, and a second spanning bar 40. Elongate blade support bar 32 may include a first elongate segment 42, a second elongate segment 44, and a third elongate segment 46. First elongate segment 42 is interlocked with second elongate segment 44 (see FIG. 3), second elongate segment 44 is interlocked with third elongate segment 46 (see FIG. 3). First elongate segment 42 may support, for example, approximately eight-and-one-half (8.5) blade sections 48, as shown in FIG. 2. Second elongate segment 44 may support, for example, approximately six (6) blade sections 48, and third elongate segment 46 may support, for example, at least approximately five-and-one-half (5.5) blade sections 48. However, this is not a requirement of the cutting assembly of the present invention, for in an alternate embodiment, first, second, and third segments 42, 44, 46 each may support, for example, an equal number of blade sections 48. Additionally, there is no requirement that elongate blade support bar 32 include exactly three interlocking elongate segments (e.g., first elongate segment 42, second elongate segment 44, and third elongate segment 46). In alternate embodiments of the cutting assembly, elongate blade support bar 32 may include only two interlocking elongate segments or may include four or more interlocking elongate segments. Elongate attach bar 36 is configured to be drivingly connected to a motor (not shown) capable of providing the mechanical energy necessary to rapidly reciprocate plurality 34 of blade sections 48. During this reciprocation, mechanical forces exerted by way of elongate attach bar 36 move cutting assembly 30 rapidly from side to side, as represented by first arrow 50 and second arrow 52. As cutting assembly 30 is moved in the direction of first arrow 50, first elongate segment 42 applies force to ("pushes") or urges second elongate segment 44, which in turn applies force to ("pushes") or urges third elongate segment 46. As cutting assembly 30 is moved in the direction of second arrow 52, first elongate segment 42 "pulls" a portion of cutting assembly 30, the portion including second elongate segment 44 and third elongate segment 46. The force opposing this pulling force is represented by relatively large arrow 54, and is derived from the mass of the portion at issue (44, 46) and from inertia (the portion was moving in the opposite direction, i.e., the direction of arrow 50). Substantially simultaneously, second segment 44 "pulls" a smaller portion of cutting assembly 30, this smaller portion including third segment 46. Similarly, the force opposing this pulling force is represented by relatively small arrow 56, representing that the magnitude of this force is smaller than the magnitude of the force represented by relatively large arrow 54. Opposing forces of this type decrease in magnitude along the length of cutting assembly 30 from the drive end 70 (which is proximate to elongate attach bar 36) to an opposing non-drive end 72. Assuming that first elongate segment 42, second elongate segment 44, and third elongate segment 46 are formed from substantially similar materials, the thickness 58 (or average thickness) of third elongate segment 46 may be less than the thickness 60 (or average thickness) of second elongate segment 44. In turn, the thickness 60 (or average thickness) of second elongate segment 44 may be less than the thickness 62 (or average thickness) of first elongate segment 42. The thickness gradient defined by first elongate segment 42, second elongate segment 44, and third elongate segment 46 does not compromise performance, because of the decreased magnitude of the forces addressed above. Hence, a thinner structure may be used at points relatively distal to drive end 70. Alternatively, a relatively light and weak material may be used to form either or both second elongate segment 44 and third elongate segment 46, in comparison to a relatively heavy and strong material that may be used in forming first elongate segment 42. In such an instance, a thickness gradient may not necessarily be present, only a mass gradient, because, for example, second elongate segment 44 still may be less dense than first elongate segment 42. Accordingly, second elongate segment 44 may have a ratio of mass to number of supported blade sections 48 that is less than the ratio of mass to number of supported blade sections 48 of first elongate segment 42. Similarly, third elongate segment 46 may have a ratio of mass to number of supported blade sections 48 that is less than the ratio of mass to number of supported blade sections 48 of first elongate segment 44.

Figure 3:
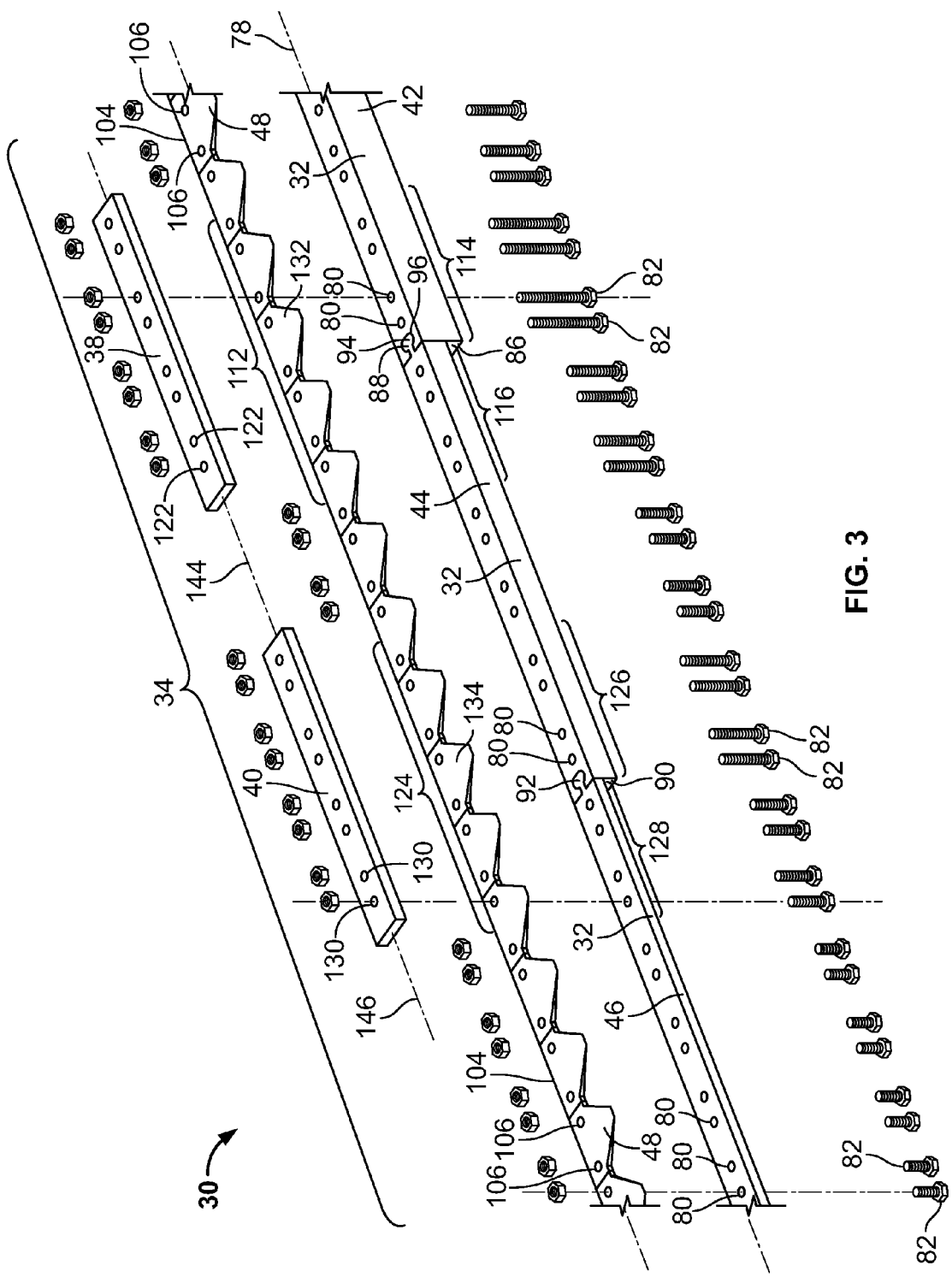
FIG. 3 is an enlarged exploded partial view, in perspective, of an exemplary embodiment of a cutting assembly of the present invention.

FIG. 3 is an exploded partial view, in perspective, of cutting assembly 30. Among other features, FIG. 3 shows additional features of elongate blade support bar 32, which includes a major axis 78 and a plurality of blade support bar through-openings 80. Each blade support bar through-opening 80 is configured to receive a fastener 82 therethrough along an axis substantially perpendicular to major axis 78. As stated previously in reference to FIG. 2, elongate blade support bar 32 may include a first elongate segment 42, a second elongate segment 44, and a third elongate segment 46. As shown in FIG. 3, first elongate segment 42 includes a first end 84 (see FIG. 2) and an opposing second end 86; second elongate segment 44 includes a third end 88 that is configured to engage second end 86 to interlock second elongate segment 44 and first elongate segment 42. When interlocked, first elongate segment 42 and second elongate segment 44 resist separation by forces generated during operation of cutting assembly 30 (see, e.g., FIG. 2 at arrow 52 and arrow 54). Referring still to FIG. 3, second elongate segment 44 includes a fourth end 90 that opposes third end 88, and third elongate segment 46 includes a fifth end 92. Fifth end 92 is configured to engage fourth end 90 to interlock third elongate segment 46 and second elongate segment 44. When interlocked, second elongate segment 44 and third elongate segment 46 resist separation by forces generated during operation of cutting assembly 30 (see, e.g., FIG. 2 at arrow 52 and arrow 56). To enable second segment 44 to engage first segment 42 by interlocking, third end 88 may include a projection 94 (see also FIG. 6A) and second end 86 may include a cavity 96 (see also FIG. 5A). Projection 94 may flare in a bulbous-like manner as shown in FIG. 3. Alternatively, projection 94 may flare in a trapezoidal-like manner, with the longer parallel side of the trapezoid serving as third end 88, such as a dove tail profile. Cavity 96, which, as shown in FIG. 3, can have a shape that substantially complements and is received by projection 94, may have an opening 98 (see FIG. 5A) that is relatively narrow in comparison to an interior lateral dimension 100 (see FIG. 5A) of cavity 96. Thus, first elongate segment 42 and second elongate segment 44 interlock when second end 86 engages first end 84 along an axis 102 (see FIGS. 5B and 6B) that is substantially perpendicular to major axis 78 (see FIG. 3). Alternatively, first end 84 may include a projection 94, and second end 86 may include the cavity. In a further embodiment, first and second ends 84, 86 each may include projections/cavities that interlock with each other.

Figure 4:
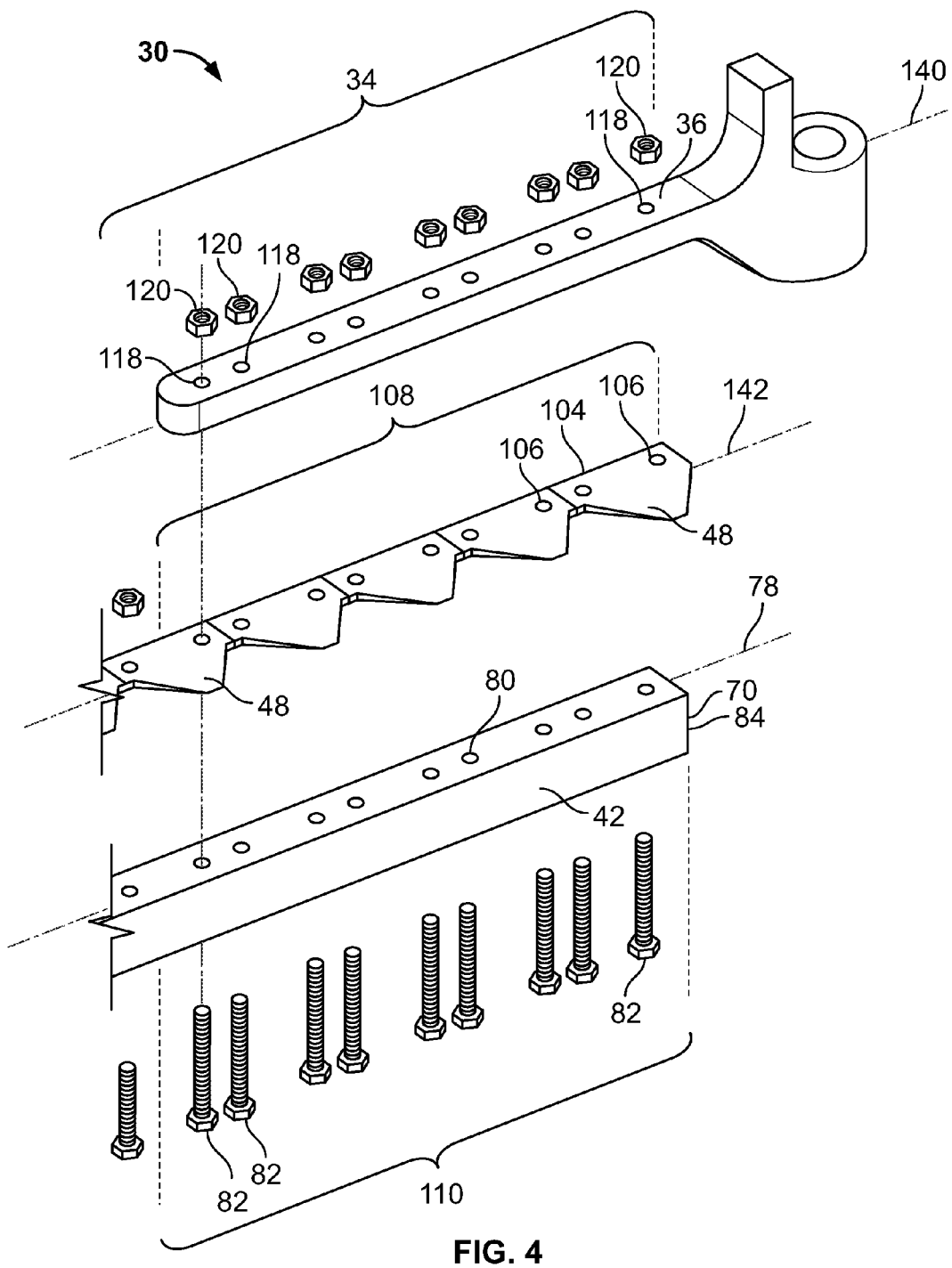
FIG. 4 is another enlarged exploded partial view, in perspective, of an exemplary embodiment of a cutting assembly of the present invention.

Referring to FIG. 3 and to FIG. 4, which is another exploded partial view, in perspective, of cutting assembly 30, plurality 34 of blade sections 48 overlies elongate blade support bar 32. Each blade section 48 has a trailing edge 104 and at least one blade aperture 106 proximate to trailing edge 104, as shown in FIGS. 3 and 4. Each blade aperture 106 is substantially coaxial to a corresponding blade support bar through-opening 80. Plurality 34 of blade sections 48 includes a first sub-plurality 108 of blade sections 48 overlying a first lengthwise portion 110 (see FIG. 4) of first elongate segment 42, first lengthwise portion 110 being proximate to first end 84. Additionally, plurality 34 of blade sections 48 includes a second sub-plurality 112 of blade sections 48 overlying both a second lengthwise portion 114 of first elongate segment 42 and a third lengthwise portion 116 of second elongate segment 44. Second lengthwise portion 114 includes second end 86, and third lengthwise portion 116 includes third end 88. Elongate attach bar 36 overlies first sub-plurality 108 of blade sections 48 and includes a plurality of attach bar through-openings 118. Each attach bar through-opening 118 is coaxial to a corresponding blade aperture 106. Referring to FIG. 4, the alignment of attach bar through-openings 118, blade apertures 106, and blade support bar through-openings 80 allows elongate attach bar 36, first sub-plurality 108 of blade sections 48, and first elongate segment 42 to be fastened together (as shown in FIGS. 2 and 4) with fasteners 82 (e.g., bolts), which may include nuts 120. Alternatively, attach bar through-openings 118 may be threaded, so that nuts 120 are not required. A first spanning bar 38 overlies second sub-plurality 112 of blade sections 48 and includes a plurality of first spanning bar through-openings 122, as shown in FIG. 3. Each first spanning bar through-opening 122 is coaxial to a corresponding blade aperture 106. Similarly, the alignment of first spanning bar through-openings 122, blade apertures 106, and blade support bar through-openings 80 allows first spanning bar 38, second sub-plurality 112 of blade sections 48, first elongate segment 42, and second elongate segment 44 to be fastened together (as shown in FIGS. 2 and 3) with fasteners 82 (e.g., bolts), which may include nuts 120. The fastening of first spanning bar 38 to both first elongate segment 42 and second elongate segment 44 assist in securing these segments in the interlocking configuration shown in FIGS. 2 and 3. Optionally, a first individual spanning blade section 132 of the second sub-plurality 112 of blade sections 48 may overlie both second lengthwise portion 114 and third lengthwise portion 116. As shown in FIG. 3, first individual spanning blade section 132 has two blade apertures 106, one of which overlies second lengthwise portion 114, and the other of which overlies third lengthwise portion 116. Fasteners 82 pass respectively through these apertures 106, allowing first individual spanning blade section 132 to assist first spanning bar 38 in securing first elongate segment 42 and second elongate segment 44 in the interlocking configuration.

As shown in FIG. 3, plurality 34 of blade sections 48 may include a third sub-plurality 124 of blade sections 48 overlying a fourth lengthwise portion 126 (see FIG. 3) of second elongate segment 44 and a fifth lengthwise portion 128 (see FIG. 3) of third elongate segment 46. Fourth lengthwise portion 126 includes fourth end 90, and fifth lengthwise portion 128 includes fifth end 92. A second spanning bar 40 overlies third sub-plurality 124 of blade sections 48 and includes a plurality of second spanning bar through-openings 130. As shown in FIG. 3, each second spanning bar through-opening 130 is coaxial to a corresponding blade aperture 106. The alignment of second spanning bar through-openings 130, blade apertures 106, and blade support bar through-openings 80 allows second spanning bar 40, third sub-plurality 124 of blade sections 48, second elongate segment 44, and third elongate segment 46 to be fastened together (as shown in FIGS. 2 and 3) with fasteners 82 (e.g., bolts), which may include nuts 120. The fastening of second spanning bar 40 to both second elongate segment 44 and third elongate segment 46 assists in securing these segments in the interlocking configuration shown in FIGS. 2 and 3. Optionally, a second individual spanning blade section 134 of the second sub-plurality 112 of blade sections 48 may overlie both fourth lengthwise portion 126 and fifth lengthwise portion 128. As shown in FIG. 3, second individual spanning blade section 134 has two blade apertures 106, one of which overlies fourth lengthwise portion 126, and the other of which overlies fifth lengthwise portion 128. Fasteners 82 pass respectively through these apertures 106, allowing second individual spanning blade section 134 to assist second spanning bar 40 in securing second elongate segment 44 and third elongate segment 46 in the interlocking configuration. Referring to FIGS. 3 and 4, elongate attach bar 36 may include a major axis 140 that is substantially parallel to major axis 78 of elongate blade support bar 32. Additionally, plurality 34 of blade sections 48 may define a major axis 142 that is substantially parallel to major axis 78 of elongate blade support bar 32. Similarly, first spanning bar 38 may include a major axis 144 that is substantially parallel to major axis 78 of elongate blade support bar 32 and/or coaxial with a major axis 146 of second spanning bar 40. Such alignment aids in compacting the design of cutting assembly 30, further reducing mass, thereby promoting the longevity of the motor drive.

Figure 5A:
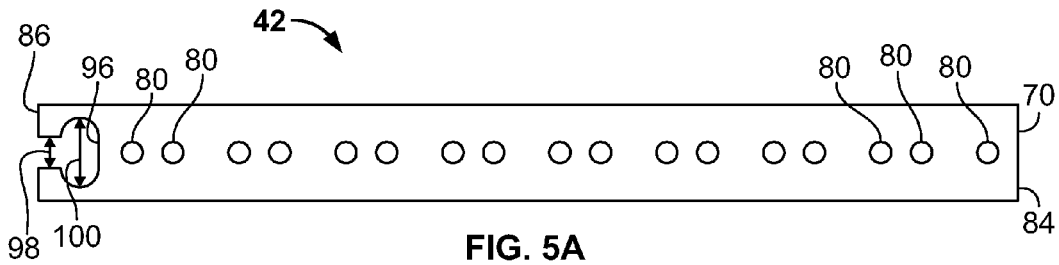
FIG. 5A is a top view of a first elongate segment of a cutting assembly of the present invention.
Figure 5B:
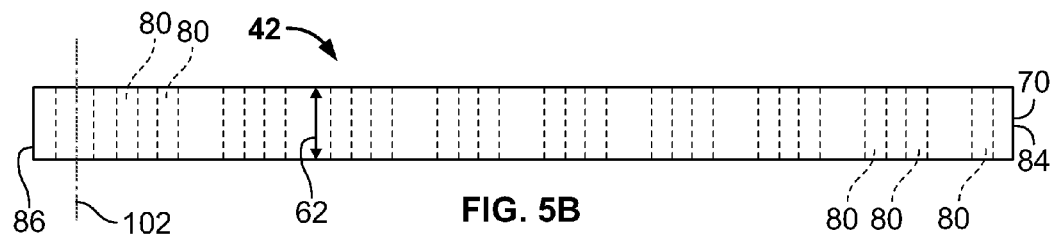
FIG. 5B is a side view of a first elongate segment of a cutting assembly of the present invention.
Figure 6A:
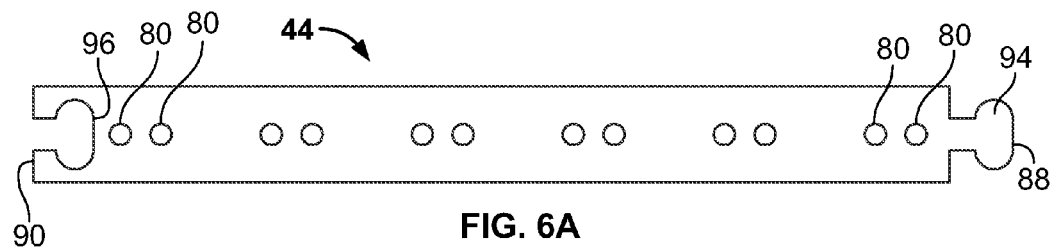
FIG. 6A is a top view of a second elongate segment of a cutting assembly of the present invention.
Figure 6B:
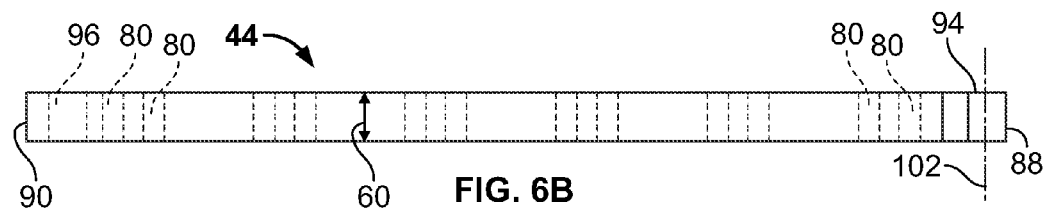
FIG. 6B is a side view of a second elongate segment of a cutting assembly of the present invention.
Figure 7A:
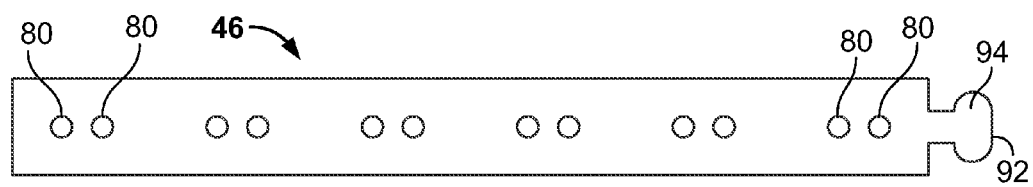
FIG. 7A is a top view of a third elongate segment of a cutting assembly of the present invention.
Figure 7B:
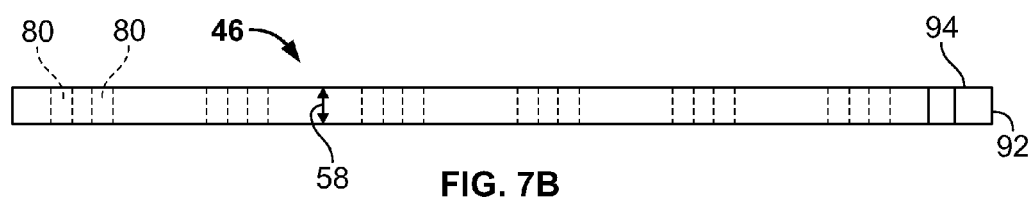
FIG. 7B is a side view of a third elongate segment of a cutting assembly of the present invention.

FIG. 5A is a top view of first elongate segment 42 showing cavity 96 and opening 98, which is relatively narrow in comparison to interior lateral dimension 100 of cavity 96. As indicated previously, cavity 96 is proximate to second end 86, and distal to first end 84 (or drive end 70). FIG. 5B, which is a side view of first elongate segment 42, shows axis 102 and, in phantom, blade support bar through-openings 80. Thickness 62 is also shown therein. FIG. 6A is a top view of second elongate segment 44 showing third end 88 and projection 94. As shown in FIG. 6A, fourth end 90 may be substantially similar to second end 86 of first elongate segment 42. More specifically, fourth end 90 may include a cavity 96. FIG. 6B, which is a side view of second elongate segment 44, shows axis 102 and, in phantom, blade support bar through-openings 80. Thickness 60 is shown therein as well. FIG. 7A is a top view of third elongate segment 46 showing fifth end 92 and another projection 94. As shown in FIG. 7A, fifth end 92 may be substantially similar to third end 88 of second elongate segment 44. FIG. 7B, which is a side view of third elongate segment 46, shows thickness 58 and, in phantom, blade support bar through-openings 80. As shown collectively in FIGS. 5B, 6B, and 7B, thickness 58 may be less than thickness 60, which in turn may be less than thickness 62.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A cutting assembly for a header of an agricultural cutting machine, the cutting assembly comprising:

an elongate blade support bar comprising a major axis and a plurality of blade support bar through-openings configured to receive a fastener therethrough along an axis substantially perpendicular to the major axis, the elongate blade support bar comprising a first elongate segment and a second elongate segment, the first elongate segment comprising a first end and an opposing second end, the second elongate segment comprising a third end, the third end engaging the second end to interlock the first elongate segment and the second elongate segment;

a plurality of blade sections overlying the elongate blade support bar, each blade section of the plurality of blade sections comprising a trailing edge and at least one blade aperture proximate to the trailing edge, the at least one blade aperture being substantially coaxial to a corresponding blade support bar through-opening, the plurality of blade sections comprising a first sub-plurality of blade sections overlying a first lengthwise portion of the first elongate segment, the first lengthwise portion being proximate to the first end, the plurality of blade sections further comprising a second sub-plurality of blade sections overlying a second lengthwise portion of the first elongate segment and a third lengthwise portion of the second elongate segment, the second lengthwise portion comprising the second end, the third lengthwise portion comprising the third end, wherein the first elongate segment comprises a first average thickness and the second elongate segment comprises a second average thickness, the second average thickness being less than the first average thickness;

an elongate attach bar overlying the first sub-plurality of blade sections and comprising a plurality of attach bar through-openings being coaxial to a corresponding aperture of the at least one blade apertures, the elongate attach bar being configured to be drivingly connected to a header; and a spanning bar overlying the second sub-plurality of blade sections and comprising a plurality of spanning bar through-openings being coaxial to a corresponding aperture of the at least one blade apertures.

2. The cutting assembly of claim 1, wherein the first elongate segment comprises a first ratio of mass to number of supported blade sections and the second elongate segment comprises a second ratio of mass to number of supported blade sections, the second ratio being less than the first ratio.

3. The cutting assembly of claim 1, wherein the second end comprises one of a projection and a cavity, and the third end comprises the other of the projection and the cavity.

4. The cutting assembly of claim 1, wherein a blade section of the second sub-plurality of blade sections overlies the second lengthwise portion of the first elongate segment and the third lengthwise portion of the second elongate segment.

5. The cutting assembly of claim 1, wherein the elongate attach bar comprises a second major axis, the second major axis being substantially parallel to the major axis of the elongate blade support bar.

6. The cutting assembly of claim 5, wherein the plurality of blade sections comprises a third major axis, the third major axis being substantially parallel to the major axis of the elongate blade support bar.

7. The cutting assembly of claim 1, wherein the spanning bar comprises a second major axis, the second major axis being substantially parallel to the major axis of the elongate blade support bar.

8. The cutting assembly of claim 1, wherein the second elongate segment comprises a fourth end opposing the third end, and wherein the elongate blade support bar comprises a third elongate segment, the third elongate segment comprising a fifth end, the fifth end engaging the fourth end to interlock the second elongate segment and the third elongate segment.

9. The cutting assembly of claim 8, wherein the plurality of blade sections comprises a third sub-plurality of blade sections overlying a fourth lengthwise portion of the second elongate segment and a fifth lengthwise portion of the third elongate segment, the fourth lengthwise portion comprising the fourth end, the fifth lengthwise portion comprising the fifth end, and wherein the spanning bar overlies the third sub-plurality of blade sections.

10. The cutting assembly of claim 8, wherein the plurality of blade sections comprises a third sub-plurality of blade sections overlying a fourth lengthwise portion of the second elongate segment and a fifth lengthwise portion of the third elongate segment, the fourth lengthwise portion comprising the fourth end, the fifth lengthwise portion comprising the fifth end, and wherein a second spanning bar overlies the third sub-plurality of blade sections and comprises a plurality of second spanning bar through-openings being coaxial to a corresponding aperture of the at least one blade apertures.

11. The cutting assembly of claim 10, wherein a blade section of the third sub-plurality of blade sections overlies the fourth lengthwise portion of the second elongate segment and the fifth lengthwise portion of the third elongate segment.

12. The cutting assembly of claim 8, wherein the first elongate segment comprises a first average thickness and the third elongate segment comprises a second average thickness, the second average thickness being less than the first average thickness.

13. The cutting assembly of claim 8, wherein the first elongate segment comprises a first ratio of mass to number of supported blade sections and the third elongate segment comprises a second ratio of mass to number of supported blade sections, the second ratio being less than the first ratio.

14. A cutting assembly for a header of an agricultural cutting machine, the cutting assembly comprising:

an elongate blade support bar comprising a major axis and a plurality of blade support bar through-openings configured to receive a fastener therethrough along an axis substantially perpendicular to the major axis, the elongate blade support bar comprising a first elongate segment and a second elongate segment, the first elongate segment comprising a first end and an opposing second end, the second elongate segment comprising a third end, the third end engaging the second end to interlock the first elongate segment and the second elongate segment;

a plurality of blade sections overlying the elongate blade support bar, each blade section of the plurality of blade sections comprising a trailing edge and at least one blade aperture proximate to the trailing edge, the at least one blade aperture being substantially coaxial to a corresponding blade support bar through-opening, the plurality of blade sections comprising a first sub-plurality of blade sections overlying a first lengthwise portion of the first elongate segment, the first lengthwise portion being proximate to the first end, the plurality of blade sections further comprising a second sub-plurality of blade sections overlying a second lengthwise portion of the first elongate segment and a third lengthwise portion of the second elongate segment, the second lengthwise portion comprising the second end, the third lengthwise portion comprising the third end, wherein the first elongate segment comprises a first average thickness and the third elongate segment comprises a second average thickness, the second average thickness being less than the first average thickness; and a spanning bar overlying the second sub-plurality of blade sections and comprising a plurality of spanning bar through-openings being coaxial to a corresponding aperture of the at least one blade apertures;

wherein the first elongate segment comprises a first ratio of mass to number of supported blade sections and the second elongate segment comprises a second ratio of mass to number of supported blade sections, the second ratio being less than the first ratio.

15. The cutting assembly of claim 14, comprising an elongate attach bar overlying the first sub-plurality of blade sections, the elongate attach bar comprising a plurality of attach bar through-openings being coaxial to a corresponding aperture of the at least one blade apertures, the elongate attach bar being configured to be drivingly connected to a header.

16. The cutting assembly of claim 14, wherein the second elongate segment comprises a fourth end opposing the third end, and wherein the elongate blade support bar comprises a third elongate segment, the third elongate segment comprising a fifth end, the fifth end engaging the fourth end to interlock the second elongate segment and the third elongate segment.

17. The cutting assembly of claim 16, wherein the plurality of blade sections comprises a third sub-plurality of blade sections overlying a fourth lengthwise portion of the second elongate segment and a fifth lengthwise portion of the third elongate segment, the fourth lengthwise portion comprising the fourth end, the fifth lengthwise portion comprising the fifth end, and wherein a second spanning bar overlies the third sub-plurality of blade sections and comprises a plurality of second spanning bar through-openings being coaxial to a corresponding aperture of the at least one blade apertures.

18. A header for a plant-cutting machine, the header comprising:
- a cutting assembly drivingly connected to a header, the cutting assembly comprising:
- an elongate blade support bar comprising a major axis and a plurality of blade support bar through-openings configured to receive a fastener therethrough along an axis substantially perpendicular to the major axis, the elongate blade support bar comprising a first elongate segment, a second elongate segment, and a third elongate segment, the first elongate segment comprising a first end and an opposing second end, the second elongate segment comprising a third end and an opposing fourth end, the third elongate segment comprising a fifth end, the third end engaging the second end to interlock the first elongate segment and the second elongate segment, the fifth end engaging the fourth end to interlock the second elongate segment and the third elongate segment;
- a plurality of blade sections overlying the elongate blade support bar, each blade section of the plurality of blade sections comprising a trailing edge and at least one blade aperture proximate to the trailing edge, the at least one blade aperture being substantially coaxial to a corresponding blade support bar through-opening, the plurality of blade sections comprising a first sub-plurality of blade sections overlying a first lengthwise portion of the first elongate segment, the first lengthwise portion being proximate to the first end, the plurality of blade sections further comprising a second sub-plurality of blade sections overlying a second lengthwise portion of the first elongate segment and a third lengthwise portion of the second elongate segment, the second lengthwise portion comprising the second end, the third lengthwise portion comprising the third end, the plurality of blade sections further comprising a third sub-plurality of blade sections overlying a fourth lengthwise portion of the second elongate segment and a fifth lengthwise portion of the third elongate segment, the fourth lengthwise portion comprising the fourth end, the fifth lengthwise portion comprising the fifth end;
- an elongate attach bar overlying the first sub-plurality of blade sections and comprising a plurality of attach bar through-openings being coaxial to a corresponding aperture of the at least one blade apertures, the elongate attach bar being configured to be drivingly connected to a header;
- a first spanning bar overlying the second sub-plurality of blade sections and comprising a plurality of first spanning bar through-openings being coaxial to a corresponding aperture of the at least one blade apertures; and
- a second spanning bar overlying the third sub-plurality of blade sections and comprising a plurality of second spanning bar through-openings being coaxial to a corresponding aperture of the at least one blade apertures;
- wherein the first elongate segment comprises a first average thickness, the second elongate segment comprises a second average thickness, and the third elongate segment comprises a third average thickness, the third average thickness being less than the second average thickness, the second average thickness being less than the first average thickness.

\* \* \* \* \*